July 30, 1935.    E. L. FIX ET AL    2,009,441
LAMINATED GLASS AND PROCESS OF MAKING THE SAME
Filed Feb. 17, 1934
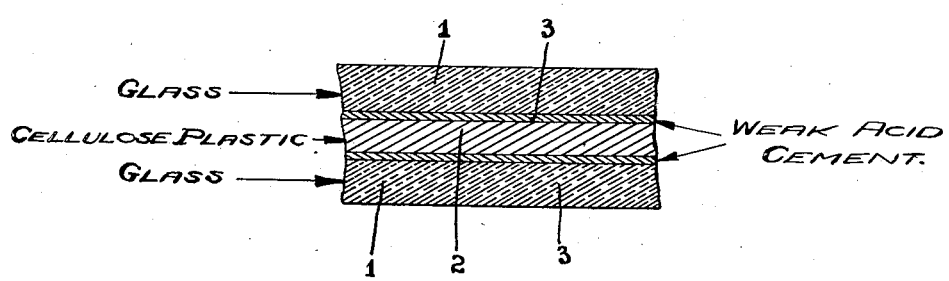
INVENTORS
EARL L. FIX and
B. J. DENNISON.
BY
Bradley & Bell
ATTORNEYS.

UNITED STATES PATENT OFFICE 2,009,441

LAMINATED GLASS AND PROCESS OF MAKING THE SAME

Earl L. Fix, New Kensington, and Brook J. Dennison, Tarentum, Pa., assignors to Duplate Corporation, a corporation of Delaware Application February 17, 1934, Serial No. 711,699

15 Claims. (Cl. 49—81)

The invention relates to laminated glass which ordinarily comprises two sheets of glass cemented to the opposite sides of a sheet of cellulose plastic, such as cellulose acetate or ethyl cellulose. Very considerable difficulty is encountered in cementing the glass to cellulose acetate and to ethyl cellulose, and the invention is directed primarily to use with these materials, although the invention is applicable to use with other cellulose products, as hereinafter more fully set forth. In connection with certain of the plastics other than the acetate and ethyl cellulose, the use of the invention is of less importance, because of the availability of other satisfactory cements, such as gelatin and casein. The objects of the invention are the provision of a process and cementing medium, (1) which can be used under ordinary compositing conditions, namely at temperatures ranging from 240 deg. to 275 deg. F; (2) which will give a product that under break tests shows results comparable with those now secured when cellulose nitrate is composited using gelatin as a cement; and (3) which shows good adhesion under continued exposure tests, such as are recognized and established in the art. A plate of laminated glass made in accordance with the invention is illustrated in the accompanying drawing, wherein:

The figure is a sectional view through the plate.

In the drawing, 1, 1 are sheets of glass; 2 is a sheet of cellulose plastic; and 3, 3 are layers of the cementing medium.

Briefly stated, the invention involves the use of certain weak acids comprising the group silicic acid, stannic acid, chromic acid, and arsenic acid. These acids have of themselves no noticeable adhesive properties and are not classed as adhesives, but when used between glass and cellulose ester plastic at a temperature of 200 deg. F. and upward, they become powerful cements peculiarly adapted for use in the manufacture of safety glass. They may be used in various ways, either alone, or in combination with other adhesives. One method involves the use of a saturated solution mixed with water or with water and a high boiling solvent. They may also be added to the so-called dopes (mixtures of cellulose plastic flake with solvents). Such dope when used by itself does not constitute a satisfactory cement, as the adhesion weakens rapidly with the passage of time, but with the addition of the weak acid, the bond is made permanent and sound after the passage of a long period of time. Similarly sodium silicate does not of itself constitute a satisfactory or commercial adhesive for safety glass because of the weak bond, but upon the addition of the weak acid, an adequate and permanent bond answering all commercial tests and requirements is secured.

A specific example of a mixture which has given good results in adhering cellulose acetate is the following:

Saturated solution silicic acid_____ 6.25 lbs.
Cellulose acetate flake_____ 42 lbs.
Acetone_____ 50 gals.
Diethyl phthalate_____ 5 gals.
Diacetone alcohol_____ 20 gals.
H2O_____ 25 gals.

The acetone and diacetone alcohol are solvents of the acetate flake, and the diethyl phthalate is a plasticizer of the acetate. Other weak acids which may be used in the formula in the proportion above given are stannic acid, chromic acid, and arsenic acid, the acid in all cases being in the form of a saturated solution.

In compositing, the above mixture is placed on the glass sheets in a thin film, preferably by spraying and allowed to dry, after which the glass is composited under heat and pressure in the usual way by the hydraulic method set forth in the Sherts and Hamill Patent No. 1,781,084, the pressure employed in the final pressing being about 150 lbs. per square inch and the temperature being about 240 deg. F. While the heat and pressure are preferably applied at the same time during the pressing operation, it is possible to apply the cementing film to the glass and heat such glass preliminary to assembling it with the cellulose acetate sheet, in which case the heat in the glass is relied upon to soften the plastic and pressure may be applied without the application of further heat.

Various plasticizers may be substituted for the diethyl phthalate compound, such as butyl cellosolve phthalate, carbitol phthalate, triacetin, ethyl meta-toluene sulphonamide, ethyl para-toluene sulphonamide, diethyl glycol, dibutyl phthalate, diamyl phthalate, diacetin, triphenol phosphate, and dibutyl carbonate.

It is also possible to use the saturated solutions of weak acids with water alone. Such compounds will give good adhesion when composited at a temperature of 240 deg. F. and upward. A specific example of the formula employed in the practice of the process using a weak acid with water alone is as follows:

| | Grams |
|---|---|
| Saturated solution silicic acid | 2 |
| Water | 97 |

It will be understood that the other weak acids heretofore referred to may be used in the above formula in place of the silicic acid and in the same amount.

All of the foregoing with respect to compositing cellulose acetate also applies to compositing ethyl cellulose, either with water solvents or dope, except that when dope is used, it requires ethyl cellulose flake in place of the cellulose acetate flake. The amount of the cellulose flake employed in the dope may vary within a considerable range without affecting the result materially. The foregoing further applies to the use of the cement in connection with reinforcing sheets of benzyl cellulose, cellulose propionate, and cellulose propionate acetate. In each case, when the cellulose dope is used, it contains a cellulose flake of the same composition as the cellulose sheet which is to be used as a reinforcing for the glass. The weak acids may also be used to good effect in connection with sodium silicate. Sodium silicate by itself does not have sufficient adhesive strength to constitute a satisfactory or commercial cement for use in safety glass, but when used with the weak acids in proper amount, a highly satisfactory cement is secured responding to all commercial requirements even after the passage of a long period of time. A specific example of the formula employed in the practice of the process using a weak acid in connection with sodium silicate is as follows:

| | Grams |
|---|---|
| Saturated solution silicic acid | 1 |
| Sodium silicate | 1.25 |
| Water | 98.75 |

The other weak acids heretofore enumerated, namely, stannic acid, chromic acid, and arsenic acid may be used in place of the silicic acid as given in the above formula. It is also possible to use other soluble silicates in the formula in place of the sodium silicate, such as potassium silicate.

What we claim is:

1. A method of compositing a sheet of cellulose plastic with a glass sheet, which comprises the steps of coating the face of the glass sheet with a solution comprising one of the group of weak acids consisting of silicic acid, stannic acid, chromic acid and arsenic acid, assembling the sheets and applying heat and pressure.

2. A method of compositing a sheet of cellulose plastic with a glass sheet, which comprises the steps of coating the face of the glass sheet with a solution comprising cellulose derivative similar in composition to that of the plastic sheet, a solvent for the cellulose derivative and one of the group of weak acids consisting of silicic acid, stannic acid, chromic acid and arsenic acid, assembling the sheets and applying heat and pressure.

3. A method of compositing a sheet of cellulose plastic with a glass sheet, which comprises the steps of coating the face of the glass sheet with a solution comprising a silicate, water and one of the group of weak acids consisting of silicic acid, stannic acid, chromic acid and arsenic acid, assembling the sheets and applying heat and pressure.

4. A method of compositing a sheet of cellulose acetate with a sheet of glass, which comprises the steps of coating the face of the glass sheet with a solution comprising one of the group of weak acids consisting of silicic acid, stannic acid, chromic acid and arsenic acid, assembling the sheets and applying heat and pressure.

5. A method of compositing a sheet of cellulose acetate with a sheet of glass, which comprises the steps of coating the face of the glass sheet with a solution comprising cellulose derivative similar in composition to that of the plastic sheet, a solvent for the cellulose derivative and one of the group of weak acids consisting of silicic acid, stannic acid, chromic acid and arsenic acid assembling the sheets and applying heat and pressure.

6. A method of compositing a sheet of cellulose acetate with a sheet of glass which comprises the steps of coating the face of the glass sheet with a solution comprising a silicate, water and one of the group of weak acids consisting of silicic acid, stannic acid, chromic acid and arsenic acid, assembling the sheets and applying heat and pressure.

7. A laminated plate comprising a pair of glass sheets cemented to the opposite sides of a sheet of cellulose plastic with a cement comprising a solution including one of the group of weak acids consisting of silicic acid, stannic acid, chromic acid and arsenic acid.

8. A laminated plate comprising a pair of glass sheets cemented to the opposite sides of a sheet of cellulose plastic with a cement comprising a solution including cellulose derivative similar in composition to that of the plastic sheet, a solvent for the cellulose derivative, and one of the group of weak acids consisting of silicic acid, stannic acid, chromic acid and arsenic acid.

9. A laminated plate comprising a pair of glass sheets cemented to the opposite sides of a sheet of cellulose plastic with a cement comprising a solution including a silicate and one of the group of weak acids consisting of silicic acid, stannic acid, chromic acid and arsenic acid.

10. A laminated plate comprising a pair of glass sheets cemented to the opposite sides of a sheet of cellulose plastic with a cement comprising a solution including sodium silicate, and one of the group of weak acids consisting of silicic acid, stannic acid, chromic acid and arsenic acid.

11. A laminated plate comprising a pair of glass sheets cemented to the opposite sides of a sheet of cellulose acetate with a cement comprising a solution including one of the group of weak acids consisting of silicic acid, stannic acid, chromic acid and arsenic acid.

12. A laminated plate comprising a pair of glass sheets cemented to the opposite sides of a sheet of cellulose acetate with a cement comprising a solution including a cellulose derivative similar in composition to that of the plastic sheet, a solvent for the cellulose derivative and one of the group of weak acids consisting of silicic acid, stannic acid, chromic acid and arsenic acid.

13. A laminated plate comprising a pair of glass sheets cemented to the opposite sides of a sheet of cellulose acetate with a cement comprising a solution including a silicate, water and one of the group of weak acids consisting of silicic acid, stannic acid, chromic acid and arsenic acid.

14. A method of compositing a glass sheet and a sheet of ethyl cellulose, which comprises the steps of coating the face of the glass sheet with a solution comprising one of the group of weak acids consisting of silicic acid, stannic acid, chromic acid, and arsenic acid, assembling the sheets and applying heat and pressure.

15. A laminated plate comprising a pair of glass sheets cemented to the opposite sides of a sheet of ethyl cellulose, with a cement comprising a solution including one of the group of weak acids consisting of silicic acid, stannic acid, chromic acid and arsenic acid.

EARL L. FIX.
BROOK J. DENNISON.